United States Patent Office 3,567,815
Patented Mar. 2, 1971

3,567,815
RECLAMATION OF LOW DENSITY EXTRUDABLE THERMOPLASTIC MATERIAL
Alan I. W. Frank, Pittsburgh, Pa., assignor to The Alan I. W. Corporation, Pittsburgh, Pa.
No Drawing. Filed Oct. 21, 1968, Ser. No. 769,404
Int. Cl. B29c 29/00; B29f 3/00
U.S. Cl. 264—176                          2 Claims

ABSTRACT OF THE DISCLOSURE

A process of reclaiming low density extrudable thermoplastic material which comprises extruding such material and thereby increasing its density and rendering it suitable for formation of products which are desirably formed with relatively high density extrudable thermoplastic material. The extrudate may be in the form of a sheet, rod, tube, slab or film from which the product may be vacuum formed or otherwise manufactured. Alternatively, the extrudate may be granulated and re-extruded. A quantity of relatively high density extrudable thermoplastic material may be added to the low density extrudable thermoplastic material before extrusion resulting in a significant increase in the extrusion rate and in uniformity of shape of the extrudate. The quantity of relatively high density extrudable thermoplastic material which is added to the low density extrudable thermoplastic material may be equal to between about five and about thirty percent by volume of the quantity of low density extrudable thermoplastic material. The bulk density of the low density extrudable thermoplastic material may be of the order of one-half to fifteen pounds per cubic foot and the bulk density of the relatively high density extrudable thermoplastic material may be of the order of fifteen to fifty pounds per cubic foot.

---

This invention relates to reclamation of low density extrudable thermoplastic material, for example, in the form of foam which may be scrap from forming operations in which foam cups or other products are produced. The term "low density extrudable thermoplastic material" as used herein means extrudable thermoplastic material having a bulk density of the order of one-half to fifteen pounds per cubic foot. The term "relatively high density extrudable thermoplastic material" as used herein means extrudable thermoplastic material having a bulk density of the order of fifteen to fifty pounds per cubic foot. The extrudable thermoplastic material may, for example, be polystyrene, polypropylene or similar thermoplastic material. For purposes of explanation and illustration I shall describe the invention in connection with the reclaiming of low density polystyrene.

I subject low density polystyrene to an extrusion process which converts the material to a plastic of relatively high density and comparable to that of virgin unexpanded material and rendering it suitable for formation of products which are desirably formed with relatively high density polystyrene. The low density polystyrene may be extruded, for example, into sheet form in which the sheet has a uniform gauge or thickness in the cross- and machine-direction of the extrudate in only one melt-processing step or pass through the extruder. Other shapes which the extrudate may take are rods, tubes, slabs and films.

The extrusion equipment may be conventional as well known to those skilled in the art. I employ extrusion equipment designed to extrude polystyrene of normal relatively high bulk density, thirty-five to forty pounds per cubic foot, in the form of pellets or beads. The low density polystyrene may be in either granular or bead form. With the extruder set for an extrusion rate of one thousand pounds per hour for polystyrene having a bulk density of the order of thirty-five to forty pounds per cubic foot and using a feed stock to the extruder consisting of low density polystyrene having a bulk density of two and one-half pounds per cubic foot, an extrusion rate of one hundred pounds per hour was attained. The extrudate was transparent and relatively free of porosity. The extrudate may be granulated and re-extruded into a finished shape which may be a sheet, rod, tube, slab or film.

The addition of a quantity of relatively high density polystyrene to the low density polystyrene before extrusion results in a significant increase in the extrusion rate and in uniformity of shape of the extrudate. Preferably the quantity of relatively high density polystyrene which is added to the low density polystyrene is equal to between about five and about thirty percent by volume of the quantity of low density polystyrene. The bulk density of the low density polystyrene is, as above stated, of the order of one-half to fifteen pounds per cubic foot and the bulk density of the relatively high density polystyrene is, as above stated, of the order of fifteen to fifty pounds per cubic foot. The following table illustrates the effectiveness of the technique of adding relatively high density polystyrene to the low density polystyrene before extruding:

| | Low bulk density polystyrene, lbs./cu. ft. | Percent by Volume of relatively high density polystyrene (pelletized) added | Extrusion rate, lbs./hr. | Sheet thickness range, inches |
|---|---|---|---|---|
| Example: | | | | |
| 1 | 2.5 | 0 | 100 | .000–.015 |
| 2 | 2.5 | 6.5 | 500 | .008–.015 |
| 3 | 2.5 | 26.4 | 800 | .012–.014 |
| 4 | | 100 | 980 | .012–.014 |

The above data were obtained using standard extrusion equipment of the size and operating conditions set to yield an extrusion rate of 980 pounds per hour with polystyrene having a bulk density of thirty-five to forty pounds per cubic foot.

The table shows that the addition of small amounts by volume of relatively high density polystyrene to the low density feed stock produces unusually large increases in extrusion rate and a relatively uniform thickness gauge on the sheet extrudate in only one melt-processing step.

While I have descirbed a present preferred method of practicing the invention it is to be distinctly understood that the invention is not limited thereto but may be otherwise variously practiced within the scope of the following claims.

I claim:
1. A process of reclaiming low density extrudable thermoplastic material which comprises feeding such low density extrudable thermosplastic material in solid form to an extruder, adding a quantity of relatively high density extrudable thermoplastic material to the low density extrudable thermoplastic material before extrusion, such added quantity of relatively high density extrudable thermoplastic material being equal to between about five and about thirty percent by volume of the quantity of low density extrudable thermoplastic material, and extruding such material in the extruder and thereby increasing its density and rendering it suitable for formation of products which are desirably formed with relatively high density extrudable thermoplastic material, the adding of said quantity of relatively high density extrudable thermoplastic material to the low density extrudable thermoplastic material before extrusion resulting in a significant increase in the extrusion rate and in uniformity of shape of the extrudate.

2. A process of reclaiming low density extrudable thermoplastic material as claimed in claim 1 in which the bulk density of the low density extrudable thermoplastic material is of the order of one-half to fifteen pounds per cubic foot and the bulk density of the relatively high density extrudable thermoplastic material is of the order of fifteen to fifty pounds per cubic foot.

References Cited

UNITED STATES PATENTS

| | | | |
|---|---|---|---|
| 2,838,801 | 6/1958 | Delong et al. | 264—53X |
| 3,395,746 | 8/1968 | Szabo et al. | 264—321X |
| 3,193,601 | 7/1965 | Billingsley | 264—176X |
| 3,409,712 | 11/1968 | Chisholm | 264—176 |
| 3,448,183 | 6/1969 | Chisholm | 264—210X |

ROBERT F. WHITE, Primary Examiner

J. H. SILBAUGH, Assistant Examiner

U.S. Cl. X.R.

264—37, 331

UNITED STATES PATENT OFFICE
CERTIFICATE OF CORRECTION

Patent No. 3,567,815            Dated March 2, 1971

Inventor(s) ALAN I W FRANK

It is certified that error appears in the above-identified paten and that said Letters Patent are hereby corrected as shown below:

In the caption, "The Alan I. W. Corporation" should be -- The Alan I W Frank Corporation--.

Signed and sealed this 6th day of July 1971.

(SEAL)
Attest:

EDWARD M. FLETCHER, JR.          WILLIAM E. SCHUYLER, JR
Attesting Officer                   Commissioner of Patents